United States Patent
Rosenkranz et al.

(10) Patent No.: US 9,255,026 B2
(45) Date of Patent: Feb. 9, 2016

(54) METHODS FOR MAKING ACTIVE LASER FIBERS

(71) Applicant: j-fiber GmbH, Jena (DE)

(72) Inventors: Jurgen Rosenkranz, Jena (DE); Wolfgang Haemmerle, Jena (DE); Lothar Brehm, Jena (DE); Katrin Roessner, Jena (DE); Robert Hanf, Eisenberg (DE)

(73) Assignee: j-fiber, GmbH, Jena (DE)

( * ) Notice: Subject to any disclaimer, the term of this patent is extended or adjusted under 35 U.S.C. 154(b) by 85 days.

(21) Appl. No.: 13/787,084

(22) Filed: Mar. 6, 2013

(65) Prior Publication Data
US 2013/0239623 A1    Sep. 19, 2013

(30) Foreign Application Priority Data

Mar. 6, 2012 (DE) .......... 10 2012 203 517
Jul. 26, 2012 (DE) .......... 10 2012 213 174

(51) Int. Cl.
C03B 37/027 (2006.01)
C03B 37/012 (2006.01)
H01S 3/094 (2006.01)

(52) U.S. Cl.
CPC ....... *C03B 37/02763* (2013.01); *C03B 37/0122* (2013.01); *C03B 37/01211* (2013.01); *C03B 37/01217* (2013.01); *C03B 37/01222* (2013.01); *H01S 3/094007* (2013.01); *C03B 2201/04* (2013.01); *C03B 2201/10* (2013.01); *C03B 2201/12* (2013.01); *C03B 2201/28* (2013.01); *C03B 2201/31* (2013.01); *C03B 2203/02* (2013.01); *C03B 2203/12* (2013.01); *C03B 2203/14* (2013.01); *C03B 2203/31* (2013.01); *C03B 2203/34* (2013.01); *C03B 2205/40* (2013.01)

(58) Field of Classification Search
CPC .................. C03B 2203/02; C03B 2203/04
See application file for complete search history.

(56) References Cited

U.S. PATENT DOCUMENTS

| | | | | |
|---|---|---|---|---|
| 3,535,017 | A * | 10/1970 | Miller | ............................ 385/126 |
| 4,978,377 | A | 12/1990 | Brehm et al. | |
| 5,158,587 | A * | 10/1992 | Kyoto et al. | ..................... 65/398 |
| 6,411,762 | B1 | 6/2002 | Anthon et al. | |
| 2002/0114602 | A1 | 8/2002 | Tardy et al. | |
| 2008/0199135 | A1* | 8/2008 | Proulx | ........................... 385/123 |
| 2010/0079855 | A1* | 4/2010 | Dong et al. | ................ 359/341.3 |
| 2010/0157418 | A1 | 6/2010 | Dong et al. | |

* cited by examiner

*Primary Examiner* — Lisa Herring
(74) *Attorney, Agent, or Firm* — Kuta IP Law, LLC; Christine M. Kuta

(57) ABSTRACT

Methods for making active laser fibers include the production of an optical fiber with disturbed (or deviated) cylindrical symmetry on the glass surface of the fiber. The methods include a preform containing a central core made of glass. In one embodiment, the preform is circular and surrounded by additional glass rods and an outer glass jacket tube. In a first alternative embodiment, this preform is merged during fiber drawing. In a second alternative embodiment, the preform merged in a process forming a compact glass body with disturbed cylindrical symmetry. This compact preform is drawn into a fiber under conditions maintaining the disturbed cylindrical symmetry.

17 Claims, 1 Drawing Sheet

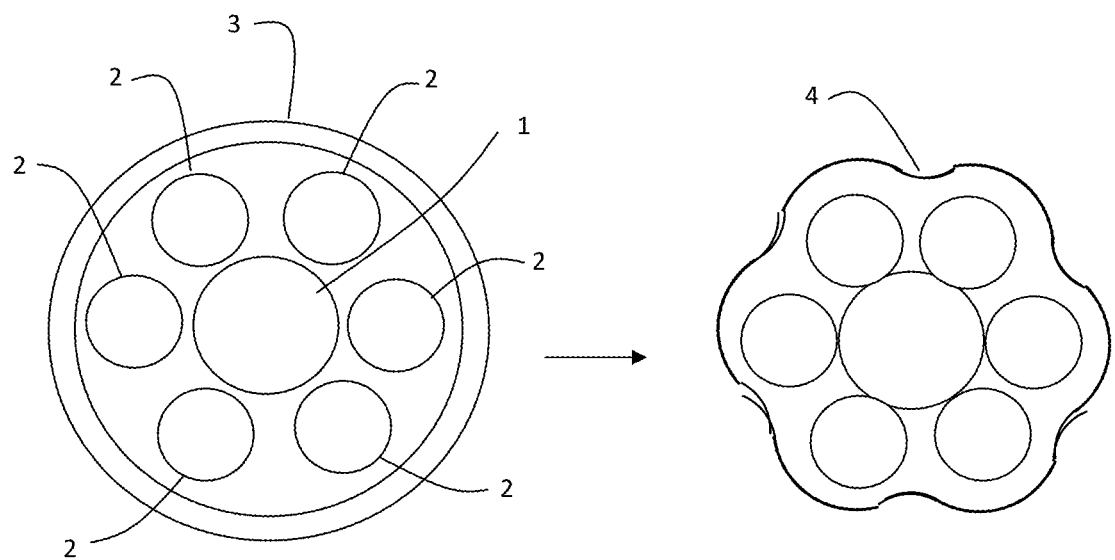
Fig 1 a　　　　　　　　　　　　　Fig 1 b
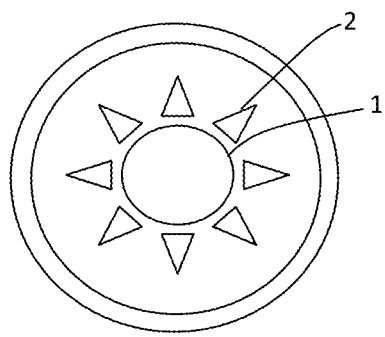　　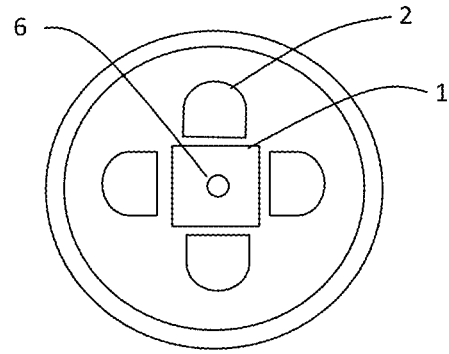
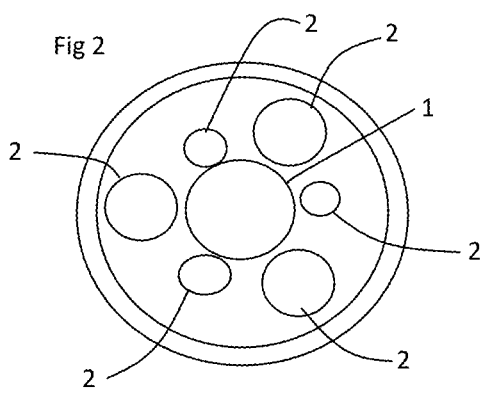　　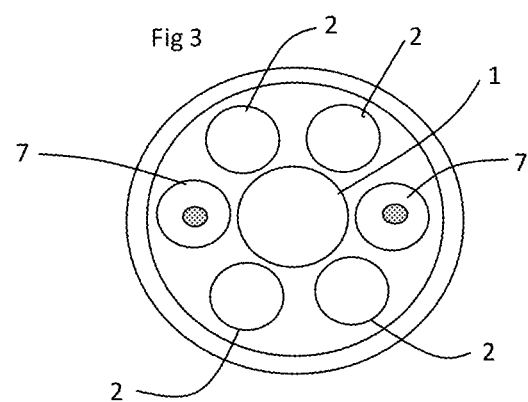
Fig 4　　　　　　　　　　　　　　Fig 5

METHODS FOR MAKING ACTIVE LASER FIBERS

BACKGROUND

Active laser fibers are used to generate laser light. Such devices are also called fiber lasers. Laser fibers typically have a doped core that is the active medium that guides the laser light. An outer pump excitation fills the complete fiber diameter and interacts with the active fiber core. Due to the multiple reflections within the core along the length of the fiber, a large gain in the laser radiation, which is coupled out at the end of the fiber, is possible.

To achieve a high yield in conversion of pump energy to laser power, active fibers containing rare-earth elements are used. The active fibers are surrounded with a pump core which is characterized by a disturbed cylindrical symmetry or by mechanical tension applied by differences in refractive index within the pump core. Conventional methods for production of these pump cores include using a cylindrical preform and creating a symmetry disturbance by the grinding of segments. The resulting pump cores exhibit a D-structure or double-D-structure or a multiple W-structure. The grinding of the preform is a separate manufacturing process that consumes resources and time.

Conventional methods for more economical production of active laser fibers include the following:

U.S. Pat. No. 6,411,762 discloses a laser fiber optimising the mode mixing by implementing doped rods around the active core. For this purpose, a multimode preform is prepared by producing holes with an ultrasonic treatment to insert the doped rods in a subsequent process step.

U.S. Pat. No. 4,978,377 discloses a production method for polarization-maintaining fibers that combines different cladding segments by conservation of their symmetry. The ultrasonic grinding as well as the combining of cladding segments is typically quite costly and generally needs a high level of technological experience.

It remains desirable to have an efficient method for making active laser fibers.

SUMMARY

A method for making active laser fibers creates a disturbance, or deviation, of the cylindrical symmetry directly during the fiber drawing process.

In a first embodiment, a method for making an optical fiber having an irregular cylindrical shape, includes arranging a first glass rod to be central to a plurality of second glass rods. The first and the second glass rods are then enclosed within an outer jacket tube to make a preform. The preform is merged into a fiber by drawing the preform to make an optical fiber having an irregular cylindrical shape.

In a second embodiment, a preform containing a central glass rod is produced. This preform is circular surrounded by additional glass rods and an outer jacket tube. This preform is molten in an intermediate step or directly during fiber drawing to a structure with disturbed cylindrical symmetry. The structure is alternatively referred to as having an irregular cylindrical shape having axial symmetry. The compact preform is afterwards drawn to a fiber. The drawing conditions are chosen to preserve the disturbed cylindrical symmetry of the preform.

In further alternative embodiments, active laser fibers with non-cylindrical symmetric pump cores are made by applying multiple additional doped or undoped glass rods to an active core and covering the arrangement of rods with a jacket tube. This jacketing process can be applied before or during the drawing process. Due to the structure of multiple glass rods around the active core, the non-cylindrical symmetry is generated in the primary preform and kept during the jacketing process. This allows the production of a non-cylindrical symmetric fiber in only one process step.

In a preferred embodiment the central glass rod has a polygonal or circular cross section, whereas the additional rods have a polygonal, circular, circular arc or circular segmented cross section.

In another preferred embodiment of the method the number of symmetry disturbances is controlled by the number of additional tubes with respect to the circumference of the preform. The degree of the symmetry disturbance can be controlled by the size of the additional tubes. This results in two parameters which can be controlled independently.

Another embodiment uses differently sized additional rods to control the symmetry disturbance. This results in locally and/or graduated symmetry disturbances.

The central rod as well as the additional rods may be doped. In a first embodiment the central rod contains a doped core wherein this core is doped with rare-earth elements. Therefore the central rod can be used to generate laser light.

In another embodiment at least one of the additional rods is completely or fractionally (i.e. partially) doped with boron. These doped additional rods are used as stress applying elements to generate tensions and the resulting birefringence in the drawn fiber. Fibers obtained from such preforms maintain the polarization of the guided light.

In another embodiment at least one of the additional elements has a different refractive index which is higher than the refractive index of the jacket tube. This increase in refractive index can be achieved by doping with an element of the fourteenth group of the periodic table such as carbon, silicon, tin, lead and particularly germanium.

In another embodiment the increase of the refractive index is achieved by doping with an element of the fifteenth group of the periodic table such as nitrogen, arsenic, antimony, bismuth, and particularly phosphorus.

The additional rods with increased refractive index can be used to guide light along with the drawn fiber. This light is used to pump the active core within the central rod.

In an embodiment of the method the melting of the central rod with the circular arranged additional rods is carried out under vacuum.

In another embodiment of the method one or more additional rods are capillaries.

The present invention together with the above and other advantages may best be understood from the following detailed description of the embodiments of the invention illustrated in the drawings, wherein:

DRAWINGS

FIG. 1a shows a starting configuration containing a central rod, multiple additional rods and a jacket tube before the collapsing process according to principles of the invention;

FIG. 1b shows the configuration of FIG. 1a after the collapsing process;

FIG. 2 shows an embodiment with polygonal (triangle shaped) additional rods;

FIG. 3 shows an embodiment with additional rods containing segments of a circle;

FIG. 4 shows an embodiment with multiple additional rods with different diameters; and FIG. 5 shows an embodiment with boron-doped additional rods.

DESCRIPTION

In the following description, equivalent elements are similarly numbered.

FIG. 1a shows the starting configuration with a central rod 1 and multiple additional rods 2. These are confined by a jacket tube 3. The central rod and the additional rods each have a circular cross section. The additional rods are arranged evenly around the axis of the central rod. The jacket tube can be attached before the drawing process or during the drawing process. The exemplary shape in FIG. 1b shows a hexagon-like cross-section, which deviates from a circular cross-section. During the following drawing process the symmetry deviation is incorporated into the fiber. FIG. 1b shows the resulting fiber cross section. The fiber has an outer shape 4, which deviates significantly from a cylindrical shape. The jacket tube 3 (see FIG. 1a) was converted during the drawing process to a filling material/glass matrix which was depressed between the additional rods. In this process the additional rods were pushed against the central rod and connected with the central rod. A transmission connection of the central rod with the additional rods is possible. If both rods have the same refractive index, a fiber with star-shaped non-cylindrical symmetric fiber core is generated.

The embodiment shown in FIG. 1b is usable to couple pump energy from the additional rods to the active core of the laser fiber. Therefore a connection between the core and the additional rods is especially helpful. The pump light guided in the additional rods enters the central rod, i.e., the laser core directly.

FIG. 2 shows another embodiment for the additional rods 2. These additional rods are built having polygonal, specifically, triangle-shaped cross-sections. The symmetry is 8-fold but not cylindrical symmetric, i.e., cylindrically irregular. The manufacture is similar to FIGS. 1a and 1b. The shown embodiment enables a broader contact between the additional rods and the central rod 1 and therefore is preferable in terms of pumping the active core. The jacket tube 3 is built in the way described before.

FIG. 3 shows an embodiment with a central rod 1 having a squared shape and a doped core 6. On each side of the central rod, there is an additional rod 2. Each additional rod has a cross-section shaped like a circular arc. The flat outer shape of each additional rod is directed to the central rod. During the collapsing process the additional rods merge with the central rod to a star shaped structure which is not cylindrically symmetric and contains a core inside which can be built as a pump core of an active laser fiber which is pumped via the additional tubes.

The additional tubes can be different sizes, i.e., the additional tubes may have different diameters. FIG. 4 shows an exemplary embodiment. The symmetry deviation (or disturbance) is not only caused by the number of additional tubes, but also by their sizes. In the shown example, an additional rod with a larger diameter is followed by an additional rod with a smaller diameter. The additional rods are spaced around the central rod evenly. It is possible to place the additional rods which may have varying diameters not uniformly arranged around the central rod. In this case the differently sized rods may be present in different numbers.

FIG. 4 shows one example with two additional rods with a larger diameter being placed on the left and right side of the central rod. Above and below this line there are smaller additional rods.

FIG. 5 shows an embodiment containing two boron-doped additional rods 7. The additional rods with a boron core generate a mechanical stress between the connecting line which causes birefringence over the cross section of the preform and drawn fiber. This fiber therefore has polarization maintaining properties.

It is to be understood that the above-identified embodiments are simply illustrative of the principles of the invention. Various and other modifications and changes may be made by those skilled in the art which will embody the principles of the invention and fall within the spirit and scope thereof.

We claim:

1. A method for making an optical fiber having an irregular cylindrical shape and a pump core with disturbed cylinder symmetry, comprising:
   arranging a first glass rod to be central to a plurality of second glass rods, and wherein the first glass rod has a shape in cross-section;
   enclosing the first and second glass rods within an outer jacket tube to make a preform;
   merging the preform by drawing the preform into a fiber wherein the plurality of second glass rods are connected with the first glass rod in the fiber, and the fiber is configured such that pump light guided in the plurality of second glass rods enters the first glass rod directly, wherein the first glass rod in the fiber retains the shape in cross-section.

2. The method of claim 1 wherein the cross-sectional shape of each of the plurality of second glass rods is selected from the group consisting of polygonal, circular, circular arc, and circular segmented.

3. The method of claim 1 wherein the irregularity in the cylindrical shape of the optical fiber depends on the number of second glass rods in the plurality, and the degree of irregularity depends on the diameters of the second glass rods in the plurality.

4. The method of claim 1 wherein the plurality of second glass rods includes rods of differing diameters.

5. The method of claim 1 wherein the first glass rod includes a core doped with at least one rare earth element such that the resulting optical fiber is capable of generating laser light.

6. The method of claim 1 further comprising merging the preform in a vacuum.

7. The method of claim 1 wherein one or more rods in the plurality of second rods are capillaries.

8. The method of claim 1 wherein at least one of the second glass rods in the plurality of second glass rods has a refractive index larger than the refractive index of the jacket tube.

9. The method of claim 8 wherein the refractive index of the at least one rod of the plurality is increased with a doping element.

10. The method of claim 9 wherein the doping element is selected from the group consisting of carbon, silicon, tin, lead and germanium.

11. The method of claim 9 wherein the doping element is germanium.

12. The method of claim 9 wherein the doping element is selected from the group consisting of nitrogen, arsenic, antimony, bismuth, and phosphorus.

13. The method of claim 9 wherein the doping element is phosphorus.

14. A method for making an optical fiber having an irregular cylindrical shape and a PUMP core with disturbed cylinder symmetry, comprising:
   arranging a first glass rod to be central to a plurality of second glass rods;

enclosing the first and second glass rods within an outer jacket tube to make a preform;

merging the preform by drawing the preform into a fiber wherein the plurality of second glass rods are connected with the first glass rod in the fiber, and the fiber is configured such that pump light guided in the plurality of second glass rods enters the first glass rod directly, wherein at least one of the rods in the plurality of second glass rods is doped with boron, wherein the doped second rod is a stress element generating mechanical stress and birefringence in the optical fiber.

15. The method of claim 14 wherein the boron-doped rod is partially doped.

16. The method of claim 14 wherein the boron-doped rod is fully doped.

17. A method for making an optical fiber having an irregular cylindrical shape, comprising:

arranging a first glass rod to be central to a plurality of second glass rods;

enclosing the first and second glass rods within an outer jacket tube to make a preform;

merging the preform by drawing the preform into a fiber wherein the plurality of second glass rods are connected with the first glass rod in the fiber, and the fiber is configured such that pump light guided in the plurality of second glass rods enters the first glass rod directly, wherein the first rod has a doped core and a first refractive index, and wherein each of the rods in the plurality of second glass rods has a second refractive index, and wherein the second refractive index is higher than the first refractive index.

* * * * *